United States Patent [19]

Yagishita

[11] 4,044,382

[45] Aug. 23, 1977

[54] TRANSMITTING SYSTEM FOR FACSIMILE AND THE LIKE

[75] Inventor: Tohmi Yagishita, Tokyo, Japan

[73] Assignee: Oki Electric Industry Co., Ltd., Tokyo, Japan

[21] Appl. No.: 604,100

[22] Filed: Aug. 13, 1975

[30] Foreign Application Priority Data

Aug. 20, 1974 Japan .................................. 49-95158

[51] Int. Cl.$^2$ ............................................. H04N 7/12
[52] U.S. Cl. .................................................. 358/260
[58] Field of Search ...................... 178/6, 6.8, DIG. 3; 358/260, 261

[56] References Cited

U.S. PATENT DOCUMENTS

| 3,840,698 | 10/1974 | Hinoshita | 178/6.8 |
| 3,895,184 | 7/1975 | Komura | 178/6 |
| 3,916,095 | 10/1975 | Weber | 178/DIG. 3 |

*Primary Examiner*—Howard W. Britton
*Attorney, Agent, or Firm*—Kenyon & Kenyon

[57] ABSTRACT

In scanning an original picture, if a large portion of a scanning line consists of only white (or only black), that portion is not transmitted. Thus, the transmitting time of a picture can be reduced. The facsimile signal consists of a synchronizing signal, a group weight indicator signal and an image signal. The image signals for each scanning line are applied only once to an operational treating circuit, so as to immediately evaluate the image signals for producing group weight indicator signals and the picture signals and for storing the signals thus produced in corresponding storing means. The synchronizing signals are stored separately in a storing means, so as to be read out from the storing means and delivered to a transmission circuit, whereby, said signal arrays are continuously read from the storing means and successively delivered to the transmission circuit.

3 Claims, 8 Drawing Figures

TRANSMITTING SYSTEM FOR FACSIMILE AND THE LIKE

BACKGROUND OF THE INVENTION

This invention relates to a facsimile transmitter for transmitting picture information, and more particularly to a system for reducing the transmitting time in a facsimile transmission by using the properties of pictures and by eliminating redundancies of pictures of reducing the amount of information to be transmitted and received.

It has been said that picture transmission by conventional facsimile consumes much time, and a wide variety of systems for reducing the transmitting time have been proposed. Of the proposed systems, those using the aforesaid redundancy elimination are called band reduction systems, and such systems have been actually used. Among the band reduction systems, the so-called run-length coding system has been well known and it is expected to greatly reduce the transmitting time. However, such conventional band reduction systems have a shortcoming in that, since the systems have to use digital transmission for sending information because of their intrinsic nature, the transmission is susceptible to various influences, such as transmission circuit characteristics including phase distortion and frequency distortion, noise, short breaks of transmission circuits, and the like. As a result, the rate of causing disturbances in the received picture is fairly high, and it is desired to minimize such disturbances by contriving system constructions which are hardly susceptible to the aforesaid influences. The band reduction systems do not provide direct transmission of the output from a photoelectric converter which scans an original picture or document (to be referred to as the "original", hereinafter) to be sent, but the transmission is carried out only after applying various logic operations to the output signals from the photo-electric converter, so that the circuit construction becomes complicated and a memory with a large capacity is required. Thus, there are various restrictions for utilizing the band reduction systems. In addition, devices for the band reduction systems are expensive.

In view of the aforesaid difficulties of the conventional techniques, the inventors have proposed improved systems for reducing the transmission time which systems are hardly susceptible to adverse influences. The present invention provides an improved transmitting system which enables the optimal use of the previously proposed transmitting-time-reducing system.

SUMMARY OF THE INVENTION

It is an object, therefore, of the present invention to overcome the disadvantages and limitations of prior facsimile transmitters by providing an improved facsimile transmitter.

The above and other objects are attained by a facsimile transmitting system having a first shift register the input of which is connected to an image signal terminal through a binary converter;

a ring-register which stores a predetermined pattern of synchronizing signal;

a second shift register whose input is connected to said first shift register through an OR circuit so that each place of the second shift register is written "one" whenever at least one place of the first shift register is one, thus the second shift register stores a pattern of a group weight indicator signal;

a third shift register whose input is connected to said first shift register, for receiving the content of the first shift register only when the first place of said second shift register is one;

an OR circuit whose output is connected to the output of the transmitting system and whose inputs are connected to the outputs of said ring register, said second shift register and said third shift register, respectively; and switching means for controlling the operation of said ring register 13, said second shift register and said third shift register.

BRIEF DESCRIPTION OF THE DRAWINGS

The foregoing and other objects, features and attendant advantages of the present invention will be appreciated as the same become better understood by the accompanying drawings wherein;

FIG. 5 (A) and FIG. 5(B) are block diagrams of a fundamental circuit of the present invention;

DETAILED DESCRIPTION OF THE PREFERRED EMBODIMENTS

According to the present invention, the predetermined number of continuous picture elements for one scanning line are divided into groups, each group consisting of a comparatively small number of adjacent picture elements; each group being evaluated and weighed for producing a group weight indicator signal B. The value of the group weight indicator signal is binary 0 in the case where the group has no picture element at all which has a concentration different from that of background, such as the blank of the original, while the value of the group weight indicator signal is binary 1 in the case where the group has at least one picture element which has a concentration different from that of the background. The group weight indicator signals B are adapted to be successively delivered in accordance with the sequence in which the groups of the picture elements are arranged. Then, the picture signals C, which represent picture elements belonging to the group having a group weight indicator signal B of value 1, are prepared for continuous and successive delivery. Synchronizing pulses A, each of which consists of a plurality of bits, represent the scanning movement on each scanning line, and each synchronizing signal A is adapted to precede the signals from the aforesaid signal families B and C. Signals to be transmitted, such as facsimile picture signals, are formed by repetitively producing serial signal arrays, each signal array including signals derived from the aforesaid three families, i.e., the signal families A, B, and C. The desired reduction of the transmitting time can be achieved by transmitting the serial signals thus prepared.

Figure 1:
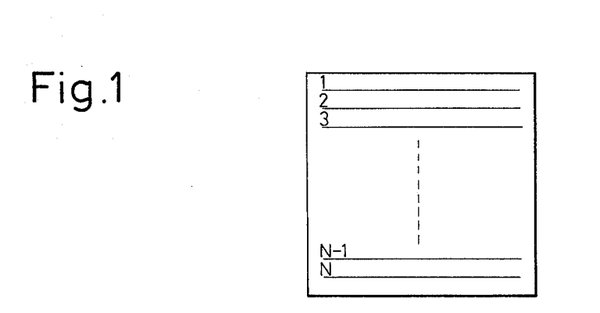
FIG. 1 shows scanning lines as defined on an original pattern, wherein N such scanning lines are shown.

FIG. 1 illustrates scanning lines which are set on an original pattern to be transmitted. One original, or one picture plane, includes N scanning lines, as numbered 1, 2, ..., N-1, and N.

Figure 2:
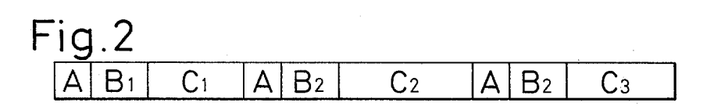
FIG. 2 is an explanatory diagram of a facsimilesignal pattern, which is designed for eliminating the redundancy of said original.

FIG. 2 illustrates the manner in which the information on the entire picture plane is transmitted in the aforesaid fashion by repeating the serial signal arrays, each array having signals from the aforesaid three signal families. The information of only the first three scanning lines is represented in FIG. 2. The suffix numerals in FIG. 2 correspond to the scanning line numbers of FIG. 1. In order to ensure the identity between the received picture signals and the transmitted picture signals, only the synchronizing signal A has a constant length, throughout the entire scanning lines, and the bit pattern of the synchronizing signal A is kept constant, also. The bit pattern of the synchronizing signal A consists of a pattern whose frequency of occurrence is minimum, and the pattern of occurrence of the signal A is discernible from the pattern of occurrence of the group weight indicator signal B and from the pattern of occurrence of the picture signal C. About twenty bits are sufficient for constituting one synchronizing signal A having the aforesaid bit pattern characteristics. The group weight indicator signal B has a constant bit length, in principle, and the bit pattern of said signal B is ever changing, depending on the contents of the original being transmitted. Both the bit length and the bit pattern of the picture signal C are ever varying. The bit length of the picture signal C is restricted so as to be equivalent to the product of the number of picture elements belonging to one group and an integer. A dummy signal may be inserted between the signal C and the signal A under certain conditions. However, the arrangement of the serial signal, as illustrated in FIG. 2, is used throughout the following explanation, because the dummy signal is merely used as the waiting time in the case where the mechanical follow-up characteristics of the related scanning mechanism are inadequate.

Figure 3:
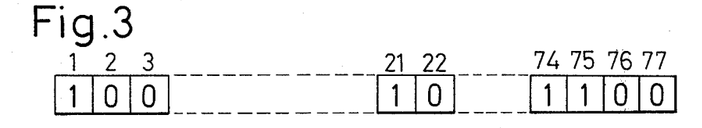
FIG. 3 is an explanatory diagram of the contents of the group weight indicator signal.

FIG. 3 illustrates an example of the group weight indicator signal B. If it is assumed that there are 77 groups on one scanning line, then 77 group weight indicator signals B are produced, as implied in FIG. 3. Starting from the extreme left end (representing the beginning of the scanning line), the 1st, 21st, 74th, and 75th groups have group weight indicator signals of value 1, indicating such groups include black picture elements therein, while the 2nd, 3rd, 22nd, 76th, and 77th groups have group weight indicator signals of value 0, indicating the total absence of black picture elements in such groups. For simplicity, the conditions of other groups are not shown in the figure. In the actual transmission the group weight indicator signal is provided with a parity and then transmitted. Actually, the original to be transmitted often includes a considerably large amount of blank spaces, and the possibility of causing all the bits in the group weight indicator signals to be 0 is comparatively high. Under such conditions, in order to improve the transmission efficiency (or transmitting speed), the bit pattern for the signal B may be modified, e.g., into a shorter length. Details of such modification, however, will not be discussed here.

As described above, in comparison with the conventional facsimile which transmits image signals as scanned along a line, the transmitting system according to the present invention is featured by operationally treating the image signals which belong to one scanning line, so as to transmit the signals in the form of serial repetition of signal arrays, each array consisting of signals from three families, i.e., the aforesaid synchronizing signals, the group weight indicator signals, and the picture signals. Thus, as compared with a system which transmits all the signals asscanned, the system according to the present invention reduces the amount of information to be transmitted to about ¼ on the average, and the transmitting time is also cut down to about ¼ on the average.

The present invention provides a system for producing the signals of the aforesaid transmitting-time-reducing type, which signals are transmitted in the form of serial repetition of signal arrays, each array consisting of signals from the three different families. Description will now be made with regard to the details of the manner in which output signals from a photo-electric converter on the transmitting side are formulated into the aforesaid serial signals to be transmitted. It should be noted here that, the method of scanning an original according to the present invention differs somewhat from that of conventional techniques, for instance, the time necessary for transmmitting one scanning line varies in the present invention depending on the contents of the original to be transmitted. Practical examples of the present invention will now be explained by the following three different scanning methods.

A. Scanning method in which both the main scanning operation and the auxiliary scanning operation have no inertia.

B1. Scanning method in which only the auxiliary scanning operation has inertia.

B2. Scanning method in which both the main scanning operation and the auxiliary scanning operation have inertia.

What is meant by the term "inertia" is mechanical inertia included in the operation of a scanning mechanism, such as a delay in starting the scanning operation or a delay in stopping the scanning operation. What is meant by the method having no inertia is that which does not involve any mechanical operation at all. Examples of such inertia-free methods are scanning by electron beam or selective scanning by electronic circuitry. Thus, the inertia refers to the follow-up characteristics of the scanning operation. In each of the aforesaid three methods, the concentration of the picture element is represented by the corresponding output signal from the photo-electric converter. The present invention as embodied in the aforesaid three practical methods will now be explained.

A. Scanning method in which both the main scanning operation and the auxiliary scanning operation have no inertia This method uses a two-dimensional camera tube, e.g., an image orthicon, a vidicon, a flying spot tube, or other electron tube using an electron beam. In scanning an original to be transmitted, both the main scanning operation and the auxiliary scanning operation are carried out by an electron beam, so that the so-called plane scanning operation can be effected while holding the original stationary. The actual scanning process is similar in fundamental principles as any of the aforesaid camera tubes, so that the scanning principles will be described.

Figure 4:
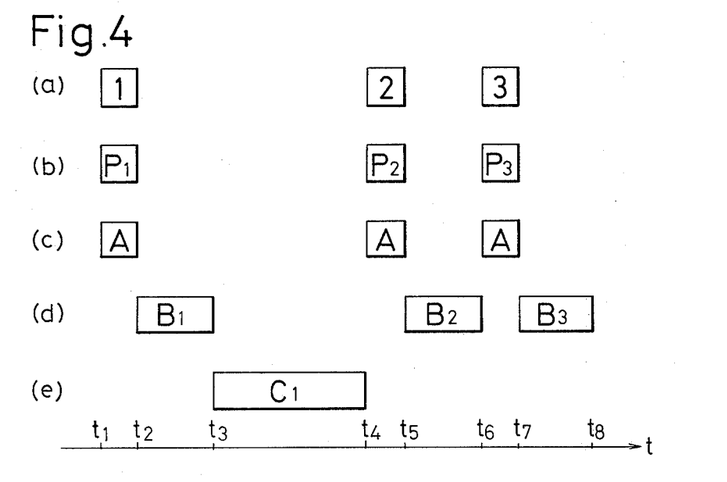
FIG. 4 is a time chart of an embodiment of the present invention, as applied to an inertia-free method.

Referring to FIG. 1, the scanning of the entire original can be completed by going through N scanning lines, as numbered 1, 2, ..., N-1, and N, which lines are defined on the original. Since the scanning is carried out very quickly by an electron beam, any line at any position can be scanned in a very short time period. It is possible to intermittently scan the lines one by one. Accordingly, the signals are produced in response to the scanning operation, as shown in FIG. 4, wherein the abscissa represents time. The block in FIG. 4a represents periods in which the scanning by an electron beam takes place. Thus, the scanning line 1 of FIG. 1 is scanned within the period from time $t_1$ to time $t_2$, while the line 2 is scanned within the $t_4$ to $t_5$ period. It is preferable to make this scanning time very short, as compared with the time needed for transmitting the information on the scanning line through transmission circuits. In this case, the scanning time is selected to be the same as the transmitting time of the synchronizing signal A. If it is assumed that 24 bits are assigned to one synchronizing signal A and the transmitting speed of the transmission circuit is 4,800 bits/sec, the delivering time of the synchronizing signal A becomes 24/4,800 = 5 mS. Thus, it is preferable to complete the scanning of one line by the electron beam in 5 mS. As shown in FIG. 4a, when the synchronizing signal A is being delivered, the electron beam scans line 1 and effects the photo-electric conversion. FIG. 4b shows that the output from the photo-electric conversion is operationally processed or treated as it is produced by the scanning. It is one of the important characteristics of the present invention that the operational treating can be finished during the scanning period.

Thus, the present invention achieves the advantage that the signal delivery time can be clearly separated from the operational treating time. In addition, the control can be simplified. The operational processing or treating of the signals obtained by the scanning of line 1 is represented by the symbol $P_1$. The period for the operational treating is identical with the period of scanning and with the period of synchronizing signal delivery. After the synchronizing signal A is transmitted, the transmission of the signals of line 1, i.e., the group weight indicator signals $B_1$ and the picture signals $C_1$, follows. Upon completing the delivery of the picture signals $C_1$, the synchronizing signal is delivered again, in order to effect similar operations on the scanning line 2. Thus, the scanning of line 2 must be performed immediately after the completion of the delivery of the picture signals $C_1$. The inertia-free scanning operation of this case can easily fulfill this requirement.

Figure 5A:
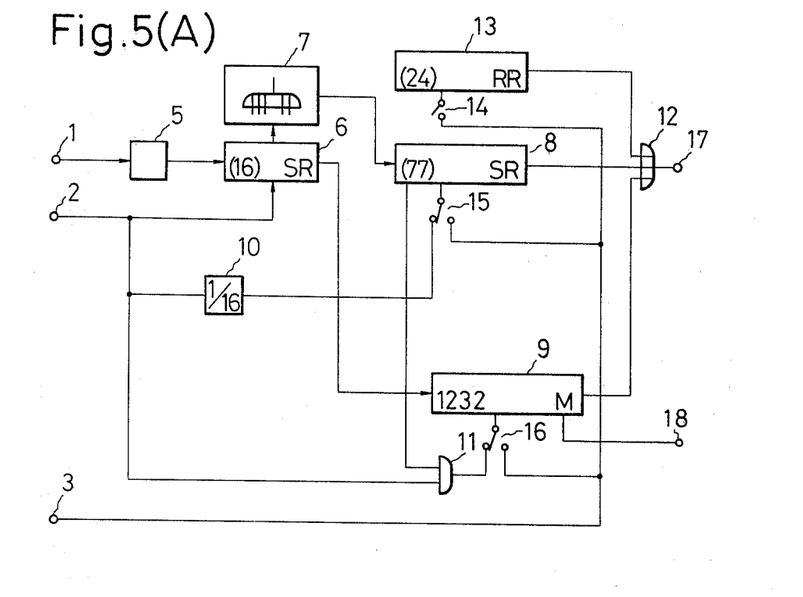
Figure 5B:
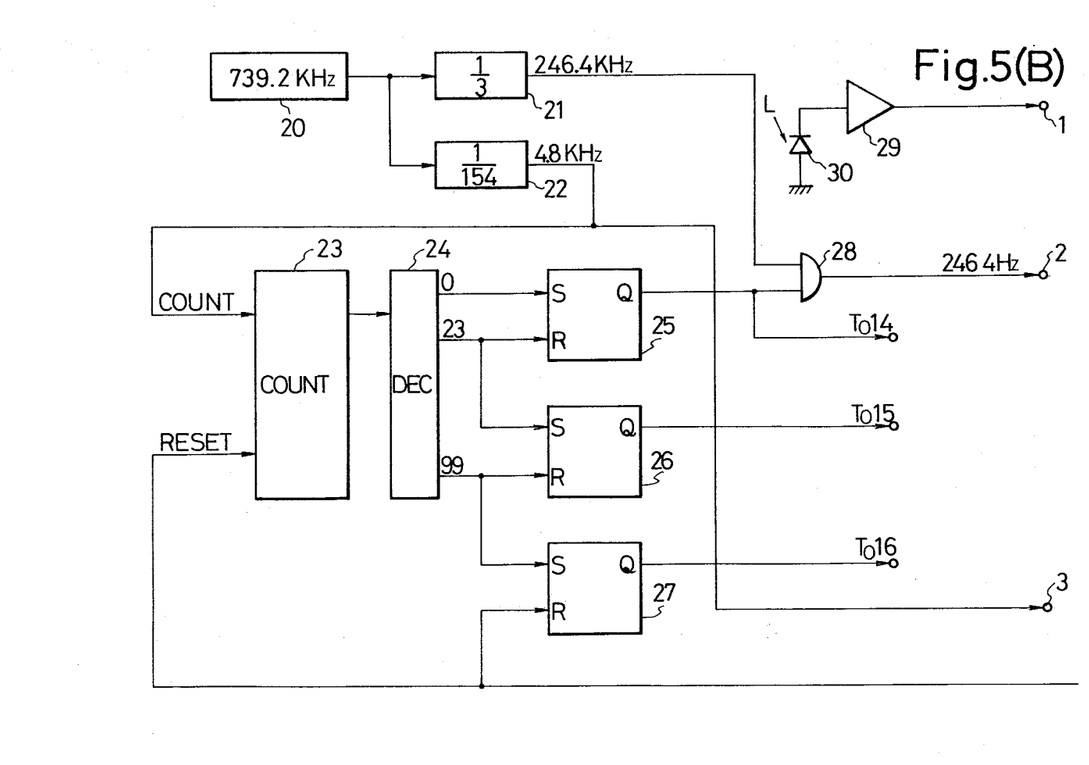

In the operational treating period $P_1$, it is necessary to clearly define the contents of the group weight indicator signal $B_1$ and the picture signal $C_1$ in accordance with the time immediately before the delivery of the group weight indicator signal $B_1$, so as to prepare for successive delivery of the signals $B_1$ and $C_1$. Electric circuits which perform these operation will now be described, with reference to the example illustrated in FIG. 5.

For the purpose of explanation, the following assumptions are made: namely, there are 1,232 picture elements, in total, on each scanning line; each scanning line is divided into 77 groups, each group including 16 picture elements; each synchronizing signal consists of 24 bits; and the transmitting speed of the transmission circuitis 4,800 bits/sec. In FIG. 5(A), reference numeral 1 represents the output terminal of a photo-electric converter, where the output signals corresponding to the 1,232 picture elements of each line are successively produced. The scanning time of one scanning line should preferably be identical with the delivery time of the synchronizing signal, which is 24/4,800 = 5 mS, as pointed out in the foregoing. Reference numeral 2 represents a clock pulse terminal which is necessary for operationally treating the image signals corresponding to the picture elements. Since said 1,232 picture elements are scanned in 5 mS, the frequency of the clock pulse should be $1,232/5\times10^{-3} = 246.4$ KHz. Reference numeral 3 represents another clock pulse terminal which is necessary for timing the delivery of the facsimile signals, as obtained by the operational treating, to the transmission circuit. Since the transmitting speed of the transmission circuit is assumed to be 4,800 bits/sec, the clock pulse at terminal 3 is 4,800 Hz.

The output signals from the photo-electricconverter, as delivered to the terminal 1, are converted into binary 1 or binary 0, by a binary converter 5. The output from the binary converter 5 is directly connected to an operational treating shift register SR 6 having 16 bits. The number of bits in the shift register 6 coincides with the number of picture elements in one group of image signals, i.e., sixteen. The 246.4 KHz clock pulse from the terminal 2 is applied to the shift register 6. Continuous 1,232 clock pulses are applied to the terminal 2 only during the scanning period. The output signal from each bit of the shift register 6 is applied to an OR gate 7, so that, if any bit of the shift register 6 has a binary 1 value, the output from the OR gate 7 becomes binary 1. Thus, the OR gate 7 assesses the weight of the image signal group, so as to determine whether the group weight indicator signal should be 1 or 0.

The output from the OR gate 7 is applied to another shift register 8 which has the same number of bits as the number of groups in one scanning line, i.e., 77 bits. The clock pulse from the terminal 2 is applied to a frequency demultiplier 10. When 16 clock pulses are applied to the frequency demultiplier 10, one output signal is produced by said demultiplier 10. This output from the demultiplier 10 is applied to the clock pulse terminal of the shift register 8 through a switch 15. This switch 15 is turned over during the period for scanning and operational treating and during the period for delivering the signal arrays to the transmission circuit. During the period for scanning and operational treating, which corresponds to one period of one sixteenth frequency of 246.4 KHz, 16 pulses of 264.4 KHz are divided into one pulse and applied to the shift register 8, so that the group weight indicator signal is determined for each 16 pulses at the terminal 2, and the group weight indicator signal thus determined is stored in the shift register 8.

The output from the shift register 6 is stored in a temporary memory 9. The clock pulse for writing information in the temporary memory 9 is provided by the logical product of the 246.4 KHz clock pulse and the output from the first place of the shift register 8, which product is prepared by an AND gate 11. The output from the AND gate 11 is applied to the clock pulse terminal of the temporary memory 9 through a switch 16. This switch 16 is turned over during the period for scanning and operational treating and during the period for delivering signals.

The operation of the aforesaid circuit is as follows. If there is one or more black picture elements among the 16 picture elements stored in the shift register 6, the group weight indicator signal for the group is evaluated as 1. The group weight indicator signal for each group is successively stored in the shift register 8. The contents of the 16 picture elements which belong to the group having a group weight indicator signal of value 1 are successively placed in the temporary memory 9. Thus, all the elements of the picture information of the group, whose group weight indicator signal is 0, zero, so that such picture information need not be stored. The maximum storing capacity of the temporary memory 9 is, however, 1,232 bits, which was determined by considering a case wherein all of the groups have a group weight indicator signal of value 1. As described above, during the scanning period, the signals to be delivered in the next step, i.e., the group weight indicator signals and the picture signals, are operationally treated and arranged in the order of delivery and are stored in an orderly fashion in the shift register 8 and in the temporary memory 9, so as to wait for the delivery. Thus, upon completion of the scanning, those signals are delivered without delay.

The 4,800 Hz clock pulse from the terminal 3 is connected to the clock pulse terminal of the shift register 8. When the time for delivering the group weight indicator signals comes, the switch 15 is so operated as to apply the 4,800 Hz clock pulse to the shift register 8, and the group weight indicator signals stored therein become serial signals which are delivered to a transmitting terminal 17 through an OR gate 12. In the figure, the reference numeral 18 shows the terminal which provides an indicator signal appearing when all the information stored in the memory 9 are read out. When the delivery is finished, the shift register 8 is empty and ready for the next cycle of operational treating. When the period for delivering or transmitting the group weight indicator signals is over, the switch 15 is turned to its neutral position, so that no clock pulses reach the shift register 8.

Then the picture signal delivering period begins, and the switch 16 is so turned as to apply the 4,800 Hz clock pulse to the temporary memory 9, for delivering the prestored picture signals in succession. When the picture signal delivering period is over, the switch 16 is turned to its neutral position, as in the case of the switch 15.

A shift register or a random access memory may be substituted for the temporary memory 9, provided that a storing capacity of 1,232 bits is ensured.

In the illustrated example, when the picture signals are stored in the temporary memory 9, the picture signals belonging to those groups whose group weight indicator signals are 0 are eliminated, while the picture signals whose group weight indicator signals are 1 are stored in an orderly fashion. Thus, it is sufficient to successively deliver the picture signals, beginning with the first bit in the temporary memory, and no treating of the signals is required at the time of transmission. Accordingly, it is sufficient to deliver only the stored number of bits, and when the temporary memory becomes empty, the picture signal delivering period is over.

The 24-bit synchronizing signal, which is to be transmitted during the synchronizing signal delivering period of FIG. 4c, has a special bit pattern and is stored in a ring register 13. When the synchronizing signal delivery period starts, the switch 14 is so turned as to apply the 4,800 Hz clock pulse to the ring register 13, for causing the delivery of the contents of the ring register 13 to the transmitting terminal 17 through the OR gate 12. Being a ring register, the contents of the register 13 are retained even after this delivery and the contents are kept ready for the next delivery beginning with the first bit.

FIG. 5(B) shows the block-diagram of the peripheral circuit for the circuit in FIG. 5(A). The circuit in FIG. 5(B) provides the image signal through the terminal 1, a clock pulse signal of 246.4 KHz through the terminal 2, a clock pulse signal of 4800 Hz through the terminal 3, and the control signals for the switches 14, 15 and 16. A pair of clock pulse signals, 4800 Hz and 246.4 KHz, must be in synchronization in phase, since a scanning operation for a single scanning line, the photo-electric conversion of the single scanning line, and the treatment of the single scanning line with 246.4 KHz must be completed within the duration of 24 bits of 4800 Hz. The synchronized signals 4800 Hz and 246.4 KHz are provided from the reference generator 20 which generates the signal of 739.2 KHz. The output of the generator 20 is applied to the ⅓ divider 21 and the 1/154 divider 22, in which the input frequency is divided to 246.4 KHz and 4800 Hz, respectively. The output (4800 Hz) of the divider 22 is applied to the terminal 3 and the counter 23, and the output (246.4 KHz) of the divider 21 is applied to the terminal 2 through the AND circuit 28 which is opened during the synchronizing period. The counter 23 has at least eleven flip-flops thus can count up to 1333 bits including the synchronizing bits (24 bits), group weight indicator bits (77 bits) and the picture bits (1232 bits). The output of the counter 23 is applied to the decoder 24, which provides output signals when the content of the counter 23 is 0, 23 and 99 at the different output lines. The 0-decode output is applied to the set terminals of the flip-flop 25, the 23-decode output is applied to the reset terminal R of the flip-flop 25 and the set terminal S of the flip-flop 26, and the 99-decode output is applied to the reset terminal R of the flip-flop 26 and the set terminal S of the flip-flop 27. The signal from the terminal 18 in FIG. 5(A) is applied to the reset terminal R of the flip-flop 27 and the reset terminal of the counter 23. Accordingly, the flip-flop 25 provides the output signal in the duration from the content of the counter being 0 to 23, which defines the synchronizing period. The flip-flops 26 and 27 define the group weight indicating period and the picture delivery period.

The photo-electric conversion element 30 provides the picture signal to the terminal 1 through the amplifier 29.

When the flip-flop 25 provides the positive output signal, the switch 14 (FIG. 5A) is closed and the switches 15 and 16 are connected to the left contacts in the figure.

When the flip-flop 26 provides the positive output signal, the switch 15 is connected to the right contact in the figure, and when the flip-flop 27 provides the positive output signal, the switch 16 is connected to the right contact in the figure.

As described above, according to the present invention, three steps for each scanning line, i.e., the scanning step, the operational treating step, and the delivery step, are conducted completely independently from each other, so that the control circuits therefore become very simple. For the operational treating step and the delivery step, it is sufficient to apply the operational treating clock pulse and the delivery clock pulse, through suitable switches, to the storing means which store the synchronizing signals, the group weight indicator signals, and the picture signals, depending on the timing of said operational treating and delivery steps. The operations of the switches 14, 15 and 16 are very simple. Due to such simplicity, the present invention has the following advantages.

In order to change the transmitting speed, e.g., from 4,800 bits/sec to 2,400 bits/sec, it is sufficient to apply 2,400 Hz clock pulses to the terminal 3, instead of the aforesaid 4,800 Hz clock pulses. In practice, the transmission system may be designed and manufactured for the maximum transmitting speed of 4,800 bits/sec, but it may also be adjusted to various transmission speeds, e.g., 2,400 bits/sec or 1,200 bits/sec, simply by providing a selective switch for selectively applying a suitable clock pulse to the terminal 3. Such arrangement can be accomplished by using very simple circuitry. This is possible because the operations for scanning, operational treating, and delivery are completely independent time-wise, and because the modification of the delivery timing irrespective of other operations does not cause any disturbance in the transmission system.

As compared with a conventional system which performs several scanning steps without clearly separating the delivery step from the operational treating step, the system according to the present invention is characterized by being free from the jitter and other picture quality deteriorating factors, because each scanning line is completely scanned in one operation by using a photo-electric converter and the operationally treating step immediately follows the scanning step.

B1. Scanning method in which only the auxiliary scanning operation has inertia

A scanning method, in which the main scanning operation has no inertia but the auxiliary scanning operation does, will now be described. An example of this method is the so-called line scanner, in which a one-dimensional scanning tube or scanning element is used for effecting selectively switched scanning by an electron beam or an electronic circuit. The scanning in the direction covered by the electron beam or the electronic circuit is free from inertia and has high follow-up characteristics. An example of the line scanner is an optical fiber tube, and various schemes using electron beams have also been developed. Since the line scanner performs only one-directional scanning, in order to scan the original in a direction lateral to that of the line scanner (i.e., auxiliary scanning), the original must be mechanically moved in the lateral direction. In this sense, the auxiliary scanning operation has inertia. Thus, the follow-up characteristics of said auxiliary scanning operation are rather poor.

Referring to FIG. 1, when the scanning operation is ready to be transferred from line 1 to line 2 for reading the desired portion of the characters or figures on the original, it is not possible in this case to proceed instantly, but the original must be mechanically moved relative to the line scanner by a distance corresponding to the spacing between the two adjacent lines. Since such mechanical movement involves transient rising and trailing characteristics, comparatively large inertia is caused. As compared with the aforesaid inertia-free scanning, this scanning operation which includes the auxiliary scanning operation with inertia has the shortcoming of being susceptible to a time loss due to the inertia.

To minimize said time loss due to inertia, the mechanical movement of the original may be carried out before the scanning is begun. In FIG. 4, the delivery of the group weight indicator signals B always follows the delivery of synchronizing signal A. As described above, during the delivery of the group weight indicator signals B, neither scanning nor the operational treatment is performed. Thus, if the mechanical movement of the original is performed during the group weight indicator signal delivery period, the dead time due to the original movement can be eliminated. Thus, even if the auxiliary scanning involves inertia, the scanning can be effected in the same manner as that of the inertia-free scanning. This is made possible because the delivery operation is clearly separated from the scanning and the operational treating operations, as pointed out above. In addition, one scanning by a photo-electric converter is sufficient for each scanning line in order to prepare and store the transmitable information prior to the actual transmission.

Therefore, even when the auxiliary scanning has inertia, if the period for moving the original is selected in the group weight indicator signal delivery period, the principles illustrated in FIGS. 4 and 5 can be used. The length of the original moving period can be calculated as follows. The group weight indicator signal delivery period for the 77 groups is 77/4,800=16 mS, provided that the transmitting speed is 4,800 bits/sec. It is sufficient to move the original by a distance corresponding to spacing between adjacent scanning lines, e.g., 1/6 mm. Such movement of the original can easily be accomplished by using a suitable mover, such as a pulse motor.

As pointed out above, even when the auxiliary scanning operation involves inertia, the method of the preceding paragraph A can be used. Thus, according to the present invention, the operational treatment is performed simultaneously with the scanning, and the result is stored in the storing means prior to transmission. The contents of the storing means are delivered during the delivery period until the storing means becomes empty. In this way, the scanning and operational treatment are clearly separated from the delivery, so that the system according to the present invention becomes highly useful by being applicable to both inertia-free scanning and scanning involving inertia.

B2. Scanning method in which both the main scanning operation and the auxiliary scanning operation have inertia a movable rotary scanning system is considered, which is often used as a scanning mechanism. Examples of the movable rotary scanning system include a rotary-drum type facsimile transmitter, a facsimile transmitter using line-to-circle conversion optical fibers, an internal scanning type facsimile transmitter using a rotary mirror, and other variations. In any one of the above examples, the primary motion of the scanner is uniform rotation. By superposing movable scanning, i.e., auxiliary scanning, on the aforesaid rotary scanning, scanning lines are defined on the original. With such a scanning method, the beginning of a scanning line occurs periodically at uniform time intervals. In this scanning method, both the main scanning and the auxiliary scanning are mechanical moving processes and involve inertia, and instantaneous starting and stopping are impossible. The mechanical motion tends to cause jittering.

Figure 6:
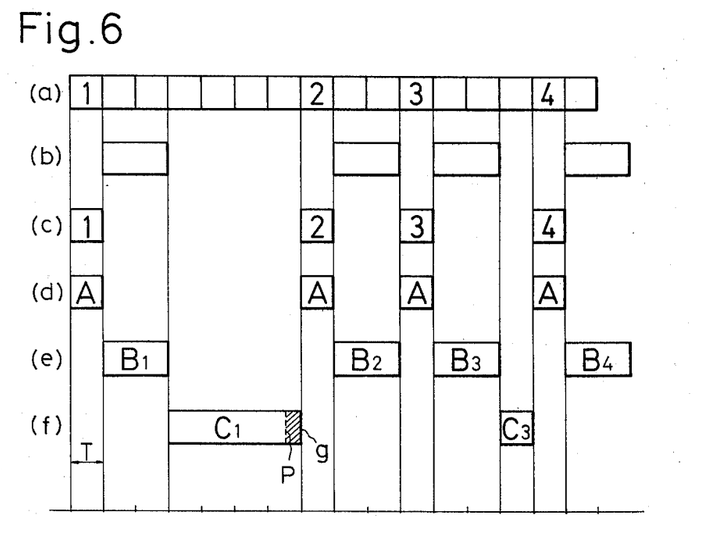
FIG. 6 is a time chart of various operations in an embodiment of the present invention, as applied to a scanning method with inertia.

As in the case of the preceding method, it is necessary in this scanning method of mechanically isolate the main scanning from the auxiliary scanning, and said auxiliary scanning should be effected by intermittently moving a scanner by a distance corresponding to the interline spacing in a very short period of time by using a pulse motor or the like. FIG. 6 illustrates a time chart of an example of this scanning method.

FIG. 6a shows scanner rotating periods. More particularly, the scanner rotates at a constant speed with a rotating time T for one revolution. Thus, the beginning of the main scanning can be set at a uniform interval T. It is preferable to synchronize the delivery of various signals with this scanning time T. If the revolving speed of the scanner is 3,000 rpm, the scanning time T becomes T=60/3,000=20 mS. The scanned output signals from a photoelectric converter during this 20 mS scanning period are operationally treated, so that group weight indicator signals and picture signals are produced and stored in the corresponding storing means for delivery at a later time, in the same manner as the preceding methods A and B1. This period for scanning and operational treatment is shown in FIG. 6d. This scanning is completed in one operation for each scanning line, the same as in the case of the preceding methods. The scanner continues its uniform rotation even afer the scanning is completed, but the photo-electric conversion does not take place except the scanning periods. If the transmitting speed is assumed to be 2,400 bits/sec, synchronizing signals are transmitted, as shown in FIG. 6d, and the bit length of the synchronizing signal becomes 48 bits. After delivering the 48 bits of the synchronizing signal A, the prestored group weight indicator signals B are delivered, as shown in FIG. 6e. This delivery does not require any operational treating of the signals. Instead, mere reading of the prestored signals until the storing means becomes empty is sufficient. In the illustrated case, horizontal and vertical parities are added to the 77 bits of the group weight indicator signals, so that 96 bits are delivered and the period for delivering the group weight indicator signals $B_1$ becomes 2T. Thus, a time period 3T elapses for delivering the synchronizing signal A and the group weight indicator signals $B_1$, and this 3T period corresponds to three revolutions of the scanner. After delivering those signals, picture signals $C_1$ are delivered immediately. No operational treatment is required for the delivery of the picture signals $C_1$. Mere reading of the prestored picture signals until the storing means becomes empty, is sufficient. The length of the picture signals $C_1$ varies, as shown by the symbols $p$ and $q$ in FIG. 6f, depending on the contents of the original. In any case, the length of the picture signals for one scanning line is represented by a product of 16 and an integer. The end of the delivering period of the picture signal $C_1$ may either coincide with the beginning of the scanning period, as shown by the symbol $q$, or not coincide with, as shown by the symbol $p$. When there is no such coincidence, as shown by the symbol $p$ of FIG. 6f, useless dummy signals may be delivered to the transmission circuits, as indicated by the shaded portion of the signal $C_1$ of the figure. The use of the dummy signals is allowed only when they are negligible as a whole.

The auxiliary scanning operation for moving the scanner will then be performed. This moving operation or auxiliary scanning operation may be preformed the time of the group weight indicator signal delivery period, as shown in FIG. 6b. In this case, a period of 40 mS is allowed for moving the scanner, and such movement can be effected by an ample margin. The auxiliary scanning of the preceding method B1 is also applicable to this case.

Accordingly, even if periodical scanning with inertia is used, the same approach as for the inertia-free method can be used by selecting a high revolving speed for scanning and by properly selecting the synchronizing signal length and the group weight indicator signal length. Although the bit lengths of all the signals are illustrated as integral multiples of the scanner revolving period, the present invention is not restricted to such an arrangement. The dummy signal, as shown by the shading and the symbol $p$ in FIG. 6f, may become necessary for ensuring the integral multiples of the scanner revolving period, but such dummy signal is not essential in the present invention. A method which does not require the dummy signal will now be described. The sum of the revolving period of the scanner and the period of the succeeding auxiliary scanning is set to be less than the sum of the synchronizing signal delivering period and the group weight indicator signal delivering period. As mentioned above, this setting is not difficult. This setting means that the time necessary for photoelectric conversion of the scanned signal and for operationally treating the thus converted signals, is shorter than the time necessary for transmitting the information belonging to the line thus scanned, and such setting makes it possible to eliminate the dead time from the transmission.

Figure 7:
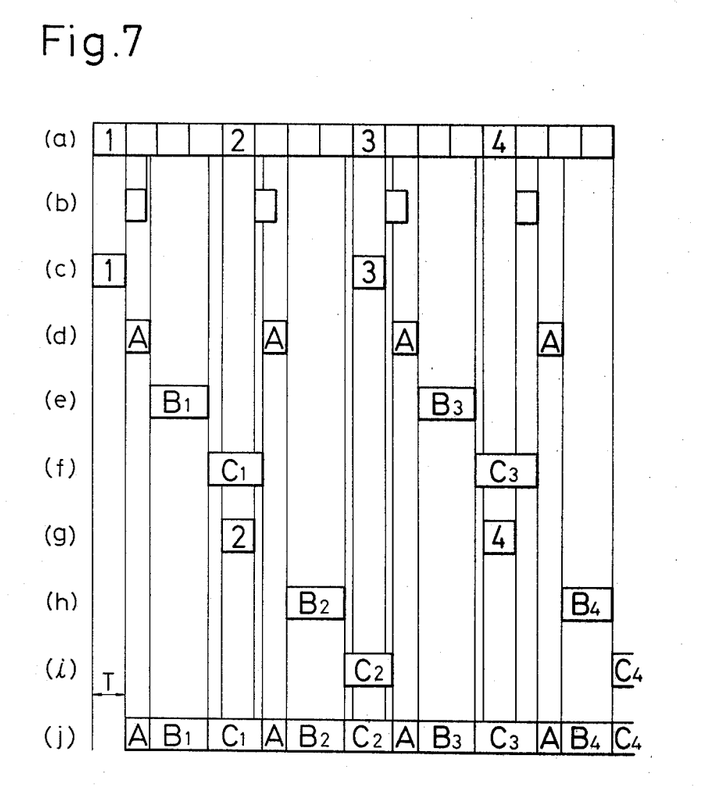
FIG. 7 is a time chart of another embodiment of the present invention, as applied to a scanning system involving main and auxiliary scannings, both with inertia, and using two systems of storing means.

FIG. 7 illustrates a time chart of an example of the last mentioned arrangement. The arrangement of FIG. 7 is characterized by using two independent systems of storing means, each system including a storing means for the group weight indicator signal and another storing means for the picture signals. In this case, one operational treating mechanism can be used in common for the two storing systems. FIG. 7a shows the revolving period of a scanner, and the period for one revolution of the scanner is indicated as T. FIG. 7b shows the auxiliary scanning period. FIG. 7c shows the operating period in which a line is scanned, and a group weight indicator signal and picture signals are produced by operationally treating the scanned signals, and the signals thus produced are stored in one storing system. FIG. 7g shows the operating period in which another line is scanned, and a group weight indicator signal and picture signals are produced by operationally treating the scanned signals, and the signals thus produced are stored in the other storing system. FIG. 7d represents the synchronizing signal delivering period. FIG. 7e shows the period in which the group weight indicator signals stored in one storing system are delivered therefrom, while FIG. 7h shows the period in which the group weight indicator signals stored in the other storing system are delivered therefrom. FIG. 7f shows the period in which the picture signals stored in one storing system are delivered therefrom, while FIG. 7i shows the period in which the picture signals stored in the other storing system are delivered therefrom. It is understood that the sum of the period T for one revolution of the scanner and the period of the auxilscanning as shown in FIG. 7b, is smaller than the sum of the length of the synchronizing signal A and the length of the group weight indicator signals, as shown in FIG. 7e or 7h. The two storing systems are used alternately in this way, so as to clearly separate the operational treating time of one storing system from the delivering time of the same system, i.e., the two storing systems are so used as to cause one system to operationally treat signals while causing the other system to deliver signals therefrom. Thus, as shown in FIG. 7j, the transmission circuit carries continuous serial signals without using dummy signals, because the dead time is eliminated from the serial signals.

In explaining the details of the operation, line 1, as shown in FIG. 7a, is scanned during the period 1 of FIG. 7c, and the signals obtained by the scanning are immediately operationally treated in order to produce group weight indicator signals and picture signals, which signals are stored in two storing means, respectively. Upon completion of the scanning of one line, auxiliary scanning is performed in a very short period of time, so as to become ready to scan the adjacent line and for the photo-electric conversion thereof. When the line scanning is finished, the synchronizing signal is delivered, as shown in FIG. 7d, and then the group weight indicator signals and the picture signals are delivered in succession. When the storing means, which carries the picture signals, is going to be emptied, such conditions are detected in order to initiate the scanning of line 2 for photo-electric conversion thereof, so as to operationally treat the signals obtained by scanning line 2 in order to produce the group weight indicator signals and picture signals, which signals thus produced are stored in the two storing means of the other storing system, respectively. By alternately repeating the storing into and delivering from the two different storing systems, a continuous serial signal having no dead time can be achieved, as shown in FIG. 7j. For timing the scanning step and the operational treating step, the amount of the remaining information in the storing means being read for signal delivery is monitored, and when the amount of the remaining information is reduced below a certain level, the scanning and operational treatment are started in the other system.

As described above, when the two systems of storing means are used, in each system, the operation for scanning and operational treatment is clearly separated from the operation for delivering. In other words, due to such separation, the alternate use of the two systems becomes possible. Each system in the two-system arrangement fulfills the same functions, as shown in FIG. 5, and by switching the two systems with proper timing, the last mentioned effects can be achieved.

In this case, as long as the sum of the scanning period and the auxiliary scanning period is kept shorter than the sum of the synchronizing signal delivering period and the group weight indicator signal delivering period, the transmission speed can be easily modified, too. To change the transmission speed in conventional systems, it has been necessary to perform painstaking work of modifying the mechanical structure and altering the revolving speed, but the system according to the present invention has an advantage in that the transmission speed can be changed simply by operating electric switches.

The foregoing descriptions of the three scanning methods clarifies that the effect of the present invention can be achieved regardless of whether or not the scanning has inertia.

As is apparent from the foregoing disclosure, according to the present invention, the operation for scanning and operational treatment is separated from the operation for delivering signals, in such a manner that facsimile signals are formed and transmitted by applying the output signals from a photo-electric converter, obtained by scanning one of several lines defined on an original, to an operational treating circuit only once for each line; immediately discriminating between the group weight indicator signals and the picture signals in order to store them in different storing means; reading and delivering synchronizing signals separately prestored in a storing means; and reading and delivering the group weight indicator signals and picture signals from said storing means immediately after the delivery of said synchronizing signals, whereby, high picture quality can be ensured by eliminating jitter therefrom. The transmitting speed of a transmission circuit can be modified simply by turning over the proper electric switches. The present invention can be applied to a conventional scanning method involving inertia, by alternately using two systems of storing means for producing facsimile signals. The nature of the facsimile signals is such that, a facsimile receiver can receive and store such signals in the form of serial signals, regardless of the scanning and treating on the transmitter side. The serial signals thus received may be stored, for instance, on magnetic recording tapes, and reproduction of the signals thus stored by the facsimile receiver at a later time provides a satisfactory picture as a recorded image.

It should be understood, of course, that the embodiments disclosed above are merely illustrative and are not intended to limit the scope of the invention. Reference should be made to the accompanying claims, therefore, rather than to the specification, as indicative of the scope of the invention.

What is claimed is:

1. A transmitting system for facsimile comprising:
   a. a first shift register (6) the input of which is connected to an image signal terminal through a binary converter (5),
   b. a ring-register (13) for storing a predetermined pattern of synchronizing signals,
   c. a second shift register (8) whose input is connected to said first shift register (6) through an OR circuit (7) so that each place of the second shift register (8) is written one whenever at least one place of the first shift register (6) is one, thus enabling the second shift register (8) to store a pattern of a group weight indicator signal,
   d. a third shift register (9) whose input is connected to said first shift register (6), for receiving the content of said first shift register (6) only when the first place of said second shift register (8) is one,
   e. an OR circuit (12) whose output is connected to the output of the transmitting system and whose inputs are connected to the outputs of said ring register (13), said second shift register (8) and said third shift register (9), respectively, and
   f. switching means (14, 15, 16) for controlling the operation of said ring register 13, said second shift register (8) and said third shift register (9).

2. A transmitting system for facsimile according to claim 1, wherein the capacity of said first shift register is 16 bits.

3. A transmitting system according to claim 1 wherein said image signal terminal delivers in succession to said input of said first shift register image signals from a number of scanned lines and wherein said switching means controls said ring register 14, said second shift register (8) and said third shift register (9) such that the image signals for each scanning line are processed independently of the image signals of every other line and are arranged for transmission into a signal array including a synchronizing signal read out from said ring register, group weight indicator signals read out from said second shift register, and picture signals read out from said third shift register.

* * * * *

UNITED STATES PATENT AND TRADEMARK OFFICE
CERTIFICATE OF CORRECTION

PATENT NO. : 4,044,382

DATED : August 23, 1977

INVENTOR(S) : Tohmi Yagishita

It is certified that error appears in the above-identified patent and that said Letters Patent are hereby corrected as shown below:

Col. 2, line 24, insert a space between "facsimile" and "signal".

Col. 3, line 3, insert a space between "achieved" and "by".

Col. 4, line 9, insert a space between "as" and "scanned".

Col. 4, line 26, correct spelling of "transmitting".

Col. 6, line 18, insert a space between "electric" and "converter".

Col. 6, line 49, change "264.4" to --246.4--.

Col. 10, line 64, change "of" to --to--.

Col. 11, line 21, correct spelling of "after".

Col. 14, line 59, change "14" to --13--.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*